(12) United States Patent
Chang et al.

(10) Patent No.: US 10,389,602 B2
(45) Date of Patent: Aug. 20, 2019

(54) AUTOMATED FEATURE DEPLOYMENT FOR ACTIVE ANALYTICS MICROSERVICES

(71) Applicant: General Electric Company, Schenectady, NY (US)

(72) Inventors: Tun Chang, San Ramon, CA (US); Erwin Cabral, San Ramon, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 395 days.

(21) Appl. No.: 15/368,955

(22) Filed: Dec. 5, 2016

(65) Prior Publication Data
US 2018/0159747 A1    Jun. 7, 2018

(51) Int. Cl.
*H04L 12/24*    (2006.01)

(52) U.S. Cl.
CPC ...... *H04L 41/5045* (2013.01); *H04L 41/5096* (2013.01)

(58) Field of Classification Search
None
See application file for complete search history.

(56) References Cited

U.S. PATENT DOCUMENTS

| | | | | |
|---|---|---|---|---|
| 10,013,550 B1* | 7/2018 | Ahuja | ........... | H04L 67/1008 |
| 10,078,537 B1* | 9/2018 | Nanda | ........... | G06F 16/188 |
| 10,230,571 B2* | 3/2019 | Rangasamy | ........... | H04L 47/70 |
| 10,242,073 B2* | 3/2019 | Koerner | ........... | G06F 16/2471 |
| 2010/0299437 A1* | 11/2010 | Moore | ........... | H04L 67/1008 709/226 |
| 2013/0166602 A1* | 6/2013 | Brunswig | ........... | G06F 16/289 707/802 |
| 2017/0046146 A1* | 2/2017 | Jamjoom | ........... | G06F 8/62 |
| 2017/0242784 A1* | 8/2017 | Heorhiadi | ........... | H04L 41/5038 |
| 2017/0331791 A1* | 11/2017 | Wardell | ........... | H04W 12/06 |
| 2018/0039494 A1* | 2/2018 | Lander | ........... | G06F 11/3688 |

* cited by examiner

*Primary Examiner* — Thomas J Dailey
(74) *Attorney, Agent, or Firm* — Buckley, Maschoff & Talwalkar LLC

(57) ABSTRACT

In some embodiments, operating data may be collected from a set of enterprise system devices via a cloud-based services architecture. The operating data may be processed, for example, via requests handled by analytic microservices. A deployment platform may create code instances of actively deployed analytic microservices and identify an existing deployed analytic microservice as being associated with a feature update, the existing deployed analytic microservice being associated with a set of pending requests. The deployment platform may create a new code instance of the identified analytic microservice and arrange for the existing deployed analytic microservice to process the set of pending requests while the new code instance handles newly received requests. The deployment platform may then determine that the existing deployed analytic microservice has completely processed the set of pending requests and retire the existing deployed analytic microservice such that it is replaced by the new code instance.

19 Claims, 13 Drawing Sheets

AUTOMATED FEATURE DEPLOYMENT FOR ACTIVE ANALYTICS MICROSERVICES

BACKGROUND

The invention relates generally to cloud-based systems to facilitate enterprise analytics. In particular, embodiments may facilitate automated feature deployment for active analytics microservices in a cloud-based architecture.

An enterprise may collect operating data from a set of enterprise system devices. For example, the enterprise may deploy sensors associated with one or more industrial assets (e.g., wind farm devices, turbine engines, etc.) and collect data as those assets operate. Note that the amount of industrial data that can be collected in this way may be significant in terms of volume, velocity, and/or variety. To help extract insight from the data, the enterprise may employ a "cloud-based" industrial internet platform to facilitate creation of applications to turn real-time operational data into insights. As used herein, a "cloud-based" industrial platform may help connect machines to collect key industrial data and stream the information to the cloud and/or leverage services and development tools to help the enterprise focus on solving problems. In this way, the cloud-based industrial platform may help an enterprise deploy scalable services and end-to-end applications in a secure environment.

In some cases, data scientists may use the cloud-based industrial platform to create analytic code algorithms (in Java, python, etc.). These algorithms may be wrapped in code to create analytics microservices that can be deployed to, and executed in, the cloud-based architecture. When actively deployed, an analytics microservice may respond to requests from users (and might be working on queue of such requests). Occasionally, features may be modified or added to a microservice. For example, a microservice might be modified such that synchronous requests (which wait for a response) are handled similar to asynchronous requests (to avoid timeouts). Other features might be associated with security elements, etc. When a feature is modified or added, it may need to be added to currently deployed analytics microservices. Note that manually updating potentially thousands of active microservices, each of which may be currently processing requests, might be impractical. Also note that service outages should be avoided if at all possible. Thus, it may be desirable to provide systems and methods to automatically facilitate microservice feature deployment in an efficient and accurate manner.

BRIEF DESCRIPTION

Some embodiments are associated with operating data that may be collected from a set of enterprise system devices via a cloud-based services architecture. The operating data may be processed, for example, via requests handled by analytic microservices. A deployment platform may create code instances of actively deployed analytic microservices and identify an existing deployed analytic microservice as being associated with a feature update, the existing deployed analytic microservice being associated with a set of pending requests. The deployment platform may create a new code instance of the identified analytic microservice and arrange for the existing deployed analytic microservice to process the set of pending requests while the new code instance handles newly received requests. The deployment platform may then determine that the existing deployed analytic microservice has completely processed the set of pending requests and retire the existing deployed analytic microservice such that it is replaced by the new code instance.

Some embodiments are associated with: means for collecting operating data from a set of enterprise system devices; means for receiving, via a cloud-based services architecture, the operating data from the set of enterprise system devices; means for processing the operating data via requests handled by a plurality of analytic microservices; means for creating, by a deployment platform, code instances of actively deployed analytic microservices; means for identifying, by the deployment platform, an existing deployed analytic microservice as being associated with a feature update, the existing deployed analytic microservice being associated with a set of pending requests; means for creating, by the deployment platform, a new code instance of the identified analytic microservice; means for arranging, by the deployment platform, for the existing deployed analytic microservice to process the set of pending requests while the new code instance handles newly received requests; means for determining, by the deployment platform, that the existing deployed analytic microservice has completely processed the set of pending requests; and means for retiring, by the deployment platform, the existing deployed analytic microservice such that it is replaced by the new code instance.

A technical feature of some embodiments is a computer system and method that automatically facilitates microservice feature deployment in an efficient and accurate manner.

Other embodiments are associated with systems and/or computer-readable medium storing instructions to perform any of the methods described herein.

DRAWINGS

DETAILED DESCRIPTION

Figure 1:
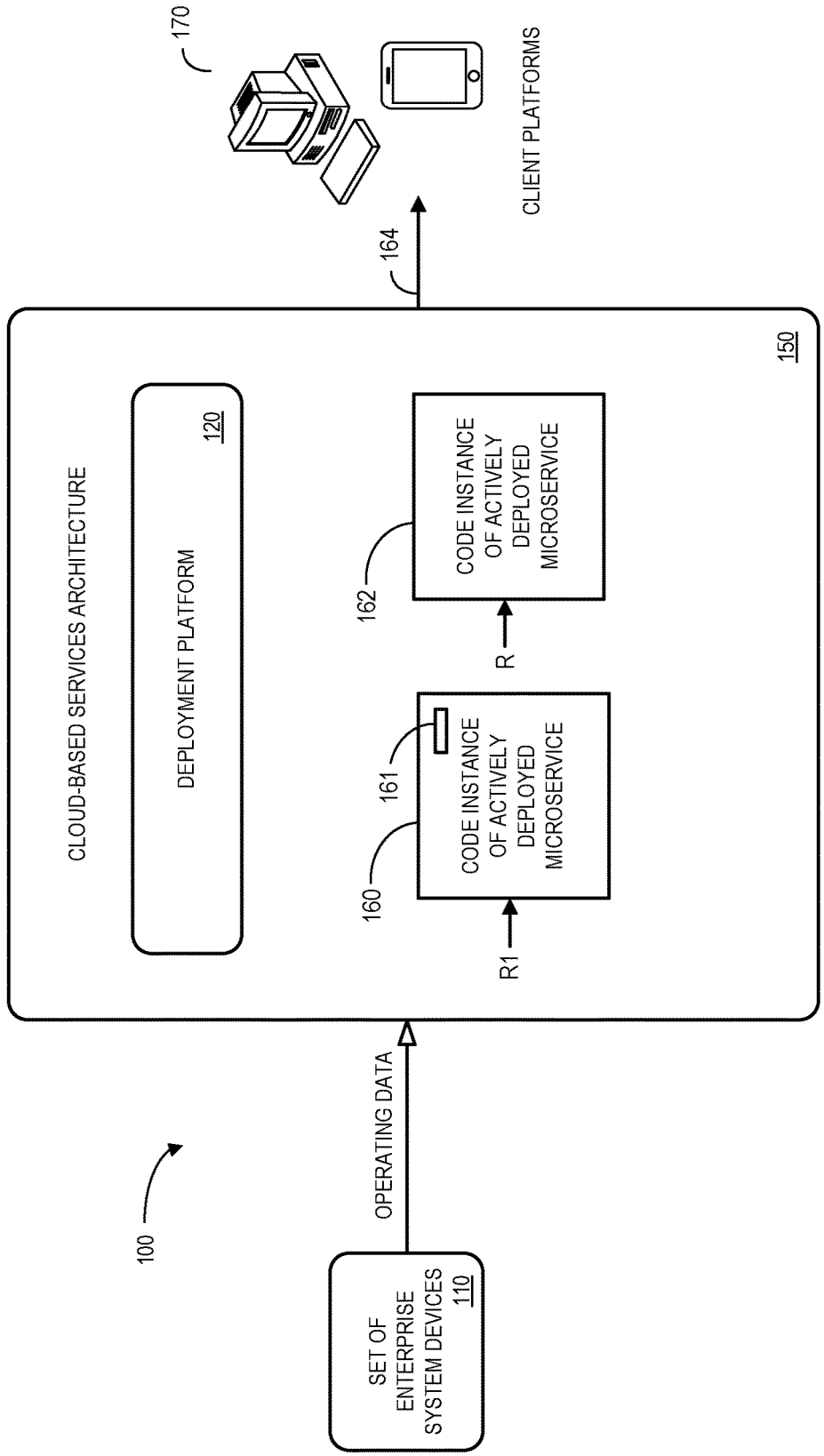
FIG. 1 is a high level block diagram of a system according to some embodiments.

Some embodiments disclosed herein automatically facilitate microservice feature deployment in an efficient and accurate manner. Some embodiments are associated with systems and/or computer-readable medium that may help perform such a method.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

An enterprise may collect operating data from a set of enterprise system devices. For example, the enterprise may deploy sensors associated with one or more industrial assets (e.g., wind farm devices, turbine engines, etc.) and collect data as those assets operate. Moreover, the amount of industrial data that can be collected in this way may be significant in terms of volume, velocity, and/or variety. To help extract insight from the data (and perhaps gain a competitive advantage), the enterprise may employ an industrial internet platform to facilitate creation of applications to turn real-time operational data into insights.

In some cases, data scientists may use the cloud-based industrial platform to create analytic code algorithms (in Java, python, etc.). These algorithms may be wrapped in code to create analytics "microservices" that can be deployed to, and executed in, the cloud-based architecture. As used herein, the term "microservice" may refer to an implementation approach for a Service-Oriented Architecture ("SOA") used to build flexible, independently deployable software systems. In some embodiments, microservices may be associated with processes that communicate with each other over a network in order to fulfill a goal. Also, like SOA, these services might use technology-agnostic protocols. According to some embodiments, a microservice may have a relatively small granularity and simple protocols. Note that distributing different responsibilities of a system into different smaller services may enhance cohesion and decrease coupling. As a result, it may be easier to change and add functions and qualities to the system. It may also let an architecture of an individual service to emerge through continuous refactoring, reducing the need for large up-front design costs.

When actively deployed, an analytics microservice may respond to requests from users (and might be working on queue of such requests). Occasionally, features may be modified or added to a microservice. For example, a microservice might be modified such that synchronous requests (which wait for a response) are handled similar to asynchronous requests (to avoid timeouts). Other features might be associated with security elements, etc. When a feature is modified or added, it may need to be added to currently deployed analytics microservices. Note that manually updating potentially thousands of active microservices, each of which may be currently processing requests, might be impractical. Also note that service outages should be avoided if at all possible. FIG. 1 is a high level block diagram of a system 100 according to some embodiments. The system 100 includes a cloud-based services architecture 150 that receives operating data from a set of enterprise system devices 110 and transmits one or more results 164 to client platforms 170 (e.g., workstations, mobile computers, smartphones, etc.).

The cloud-based services architecture 150 includes a deployment platform 120 associated with a set of code instances of actively deployed microservices 160, 162. Note that each code instance of an actively deployed microservice 160, 162 may process requests ("R1" and "R") which may represent, for example, operating data or an output from another microservice. In the example of FIG. 1, the deployment platform 120 has determined that a first microservice 160 is associated with a feature update (illustrated by a dash "–" symbol 161) while a second microservice 162 is not.

Figure 2:
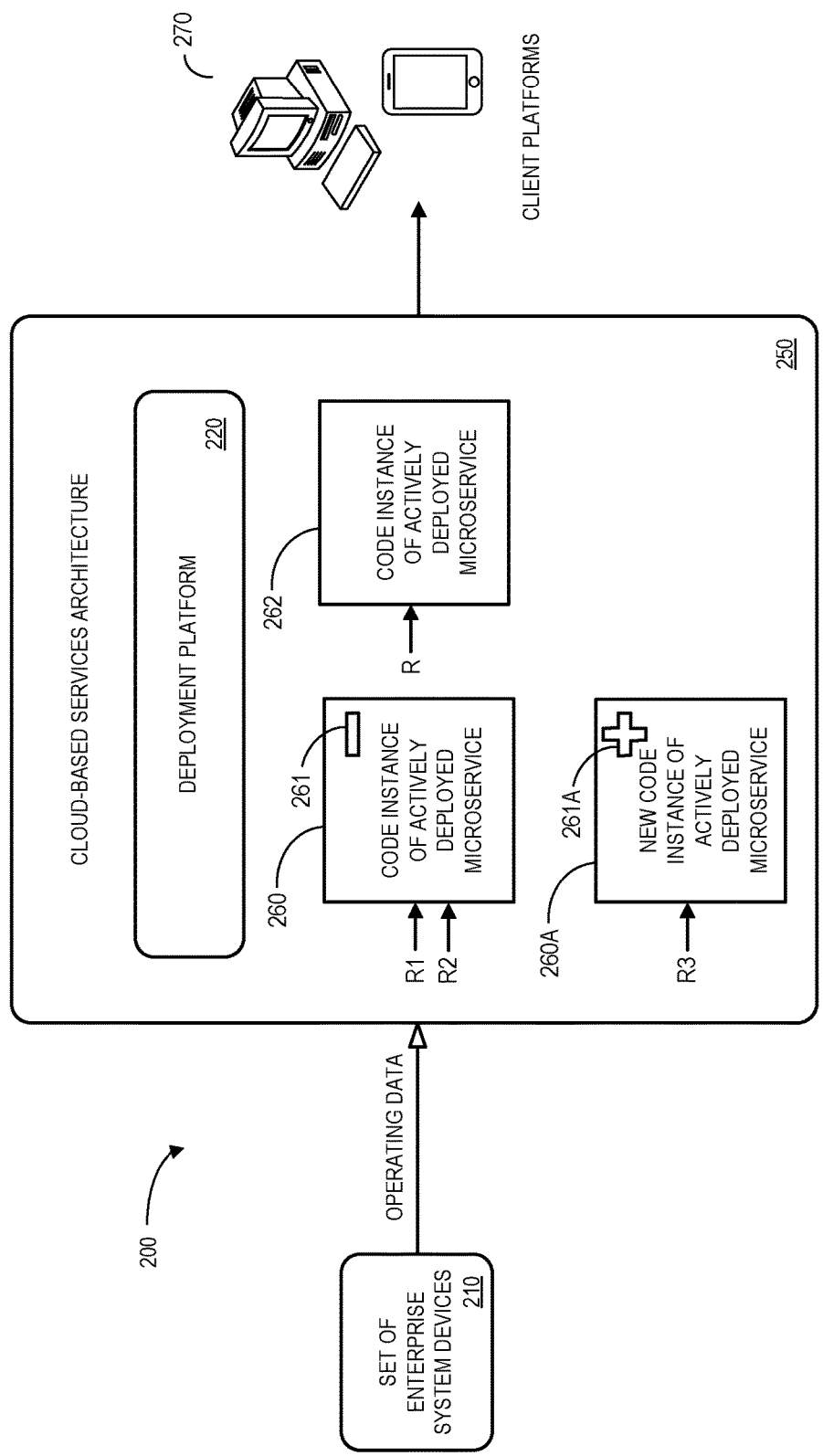
FIG. 2 illustrates a system in which a new code instance of an actively deployed microservice has been created according to some embodiments.

FIG. 2 illustrates a system 200 in which a new code instance of an actively deployed microservice has been created according to some embodiments. As before, a cloud-based services architecture 250 receives operating data from a set of enterprise system devices 210 and transmits one or more results to client platforms 270. The cloud-based services architecture 250 includes a deployment platform 220 associated with a set of code instances of actively deployed microservices 260, 262, and the deployment platform 220 has determined that a first microservice 260 is associated with a feature update (illustrated by a dash "–" symbol 261) while a second microservice 262 is not. As a result, a new code instance of the first actively deployed microservice 260A is created that includes the new feature update (illustrated by a plus "+" symbol 261A). Note that the original code instance 260 may continue to process existing requests (e.g., "R1" and "R2" will be processed without the new feature) while the newly created code instance 260A will process new requests ("R3").

Figure 3:
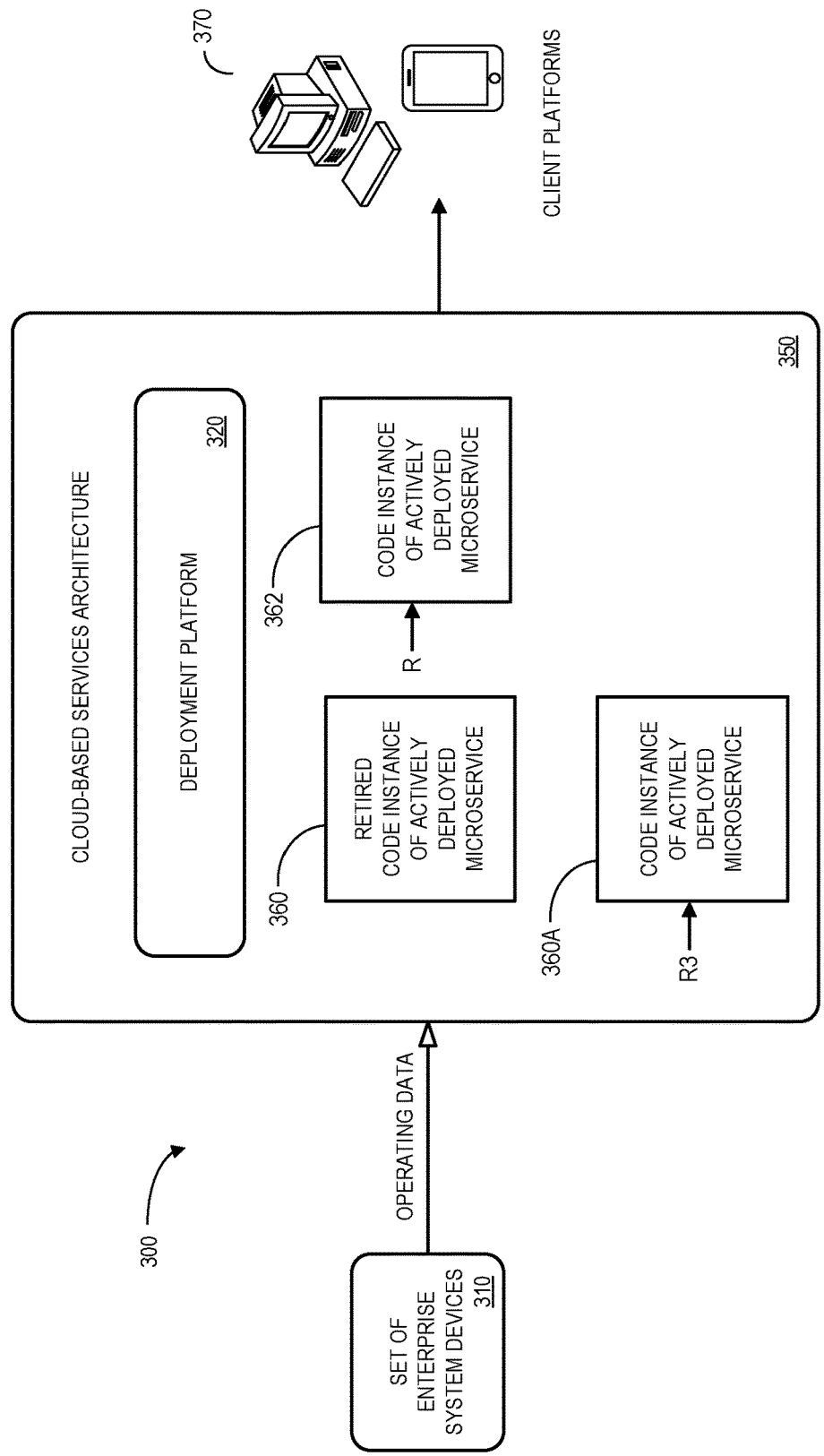
FIG. 3 is block diagram of a system in which a code instance of an actively deployed microservice has been retired in accordance with some embodiments.

FIG. 3 is block diagram of a system 300 in which a code instance of an actively deployed microservice has been retired in accordance with some embodiments. Once again, a cloud-based services architecture 350 receives operating data from a set of enterprise system devices 310 and transmits one or more results to client platforms 370. The cloud-based services architecture 350 includes a deployment platform 320 associated with a set of code instances of actively deployed microservices 360, 362, and the deployment platform 320 has determined that a first microservice 360 is associated with a feature update while a second microservice 362 is not. As a result, a new code instance of the first actively deployed microservice 360A was created with that feature update. The original code instance 260 has processed all previously existing requests while the newly created code instance 360A is still processing new requests ("R3"). At this stage, the deployment platform can retire the first code instance of the actively deployed microservice 360 (that is, the instance has finished processing all requests and will not receive any new requests).

Figure 4:
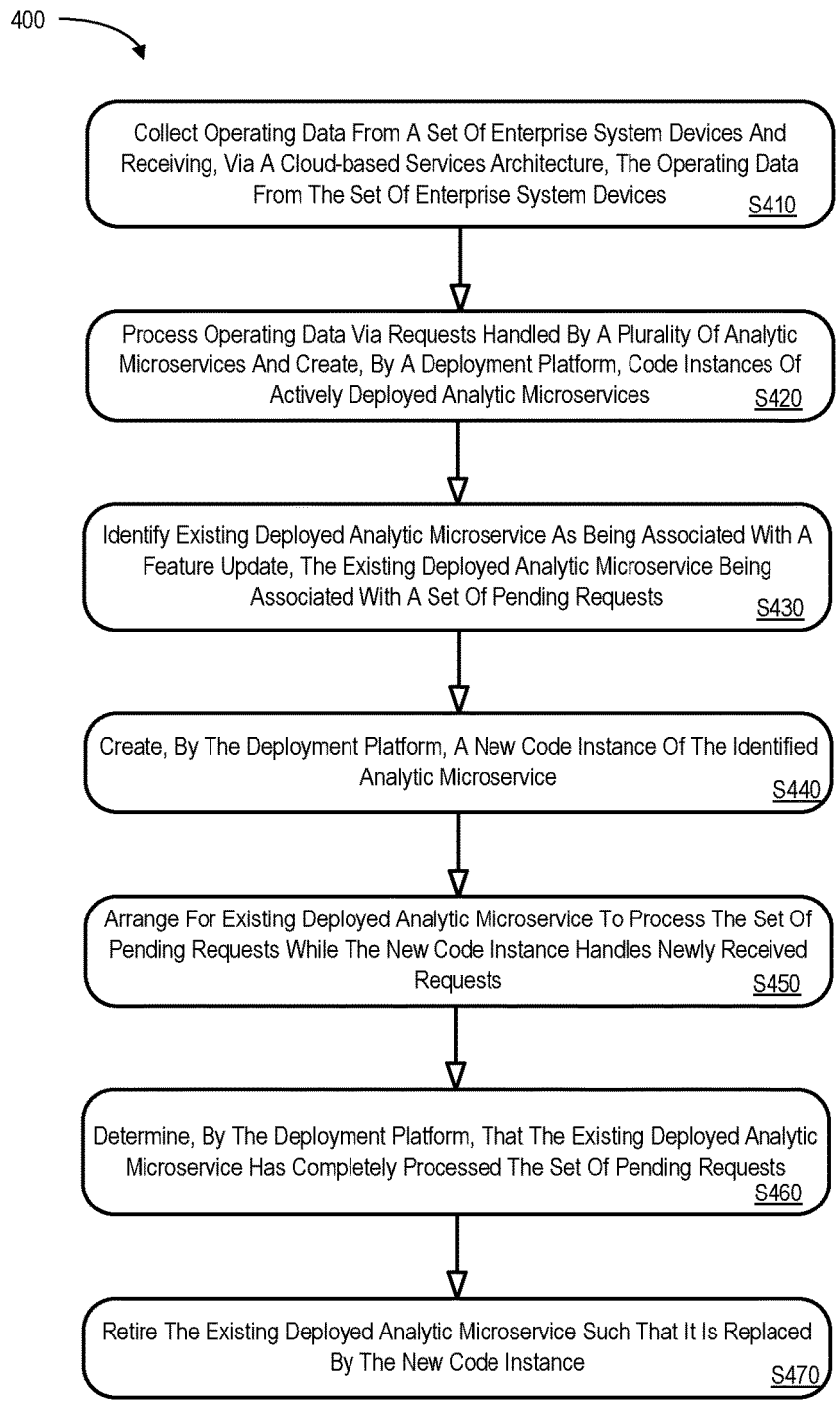
FIG. 4 is a flow chart of a method in accordance with some embodiments.

Note that the systems 100, 200, 300 of FIGS. 1 through 3 are provided only as examples, and embodiments may be associated with additional elements or components. According to some embodiments, the elements of the systems 100, 200, 300 automatically facilitate microservice feature deployment in an efficient and accurate manner. Consider, for example, FIG. 4 which is a flow chart of a method 400 associated with a method in accordance with some embodiments. The flow charts described herein do not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

At S410, a set of enterprise system devices may collect and transmit operating data. The set of enterprise system devices might be associated with, for example, sensors, a big data stream, an industrial asset, a power plant, a wind farm, a turbine, power distribution, fuel extraction, healthcare, transportation, aviation, manufacturing, water processing, etc. Moreover, a cloud-based services architecture may receive the operating data from the set of enterprise system devices. The cloud-based services architecture may further be associated with, for example, edge software, data management, security, development operations, and/or mobile applications. At S420, the system may process the operating data via a plurality of analytic microservices handled by a deployment platform that creates code instances of actively deployed analytic microservices.

At S430, the system may identify an existing deployed analytic microservice as being associated with a feature update, the existing deployed analytic microservice being associated with a set of pending requests. The feature update might be associated with, for example, a security element, synchronous request processing, and/or asynchronous request processing. At S440, the deployment platform may create a new code instance of the identified analytic microservice. At S450, the deployment platform may arrange for the existing deployed analytic microservice to process the set of pending requests while the new code instance handles newly received requests.

At S460, the deployment platform may determine that the existing deployed analytic microservice has completely processed the set of pending requests. Finally, at S470 the deployment platform may retire the existing deployed analytic microservice such that it is replaced by the new code instance.

According to some embodiments, a deployment platform may identify a plurality of existing deployed analytic microservices as being associated with feature updates and simultaneously create new code instances for the microservices. For example, the deployment platform might identify fifty actively deployed analytic microservices as needing a feature update and simultaneously arrange for all of the microservices to be updated. According to other embodiments, a deployment platform may identify a plurality of existing deployed analytic microservices as being associated with feature updates and simultaneously create new code instances for a subset of the microservices. For example, a deployment platform might identify five hundred actively deployed analytic microservices as needing a feature update and begin to arrange for batches of ten microservices to be updated at a time (until all five hundred have been updated).

According to some embodiments, the deployment platform may further, prior to arranging for the new code instance to handle newly received requests at S450, execute a performance test for the new code instance. For example, the performance test might be associated with a simulated response to a request, a database use, and/or sensor data use. In this case, the deployment platform would only route new requests to the new instance only after the deployment platform verifies that the updated microservice is operating appropriately.

Figure 5:
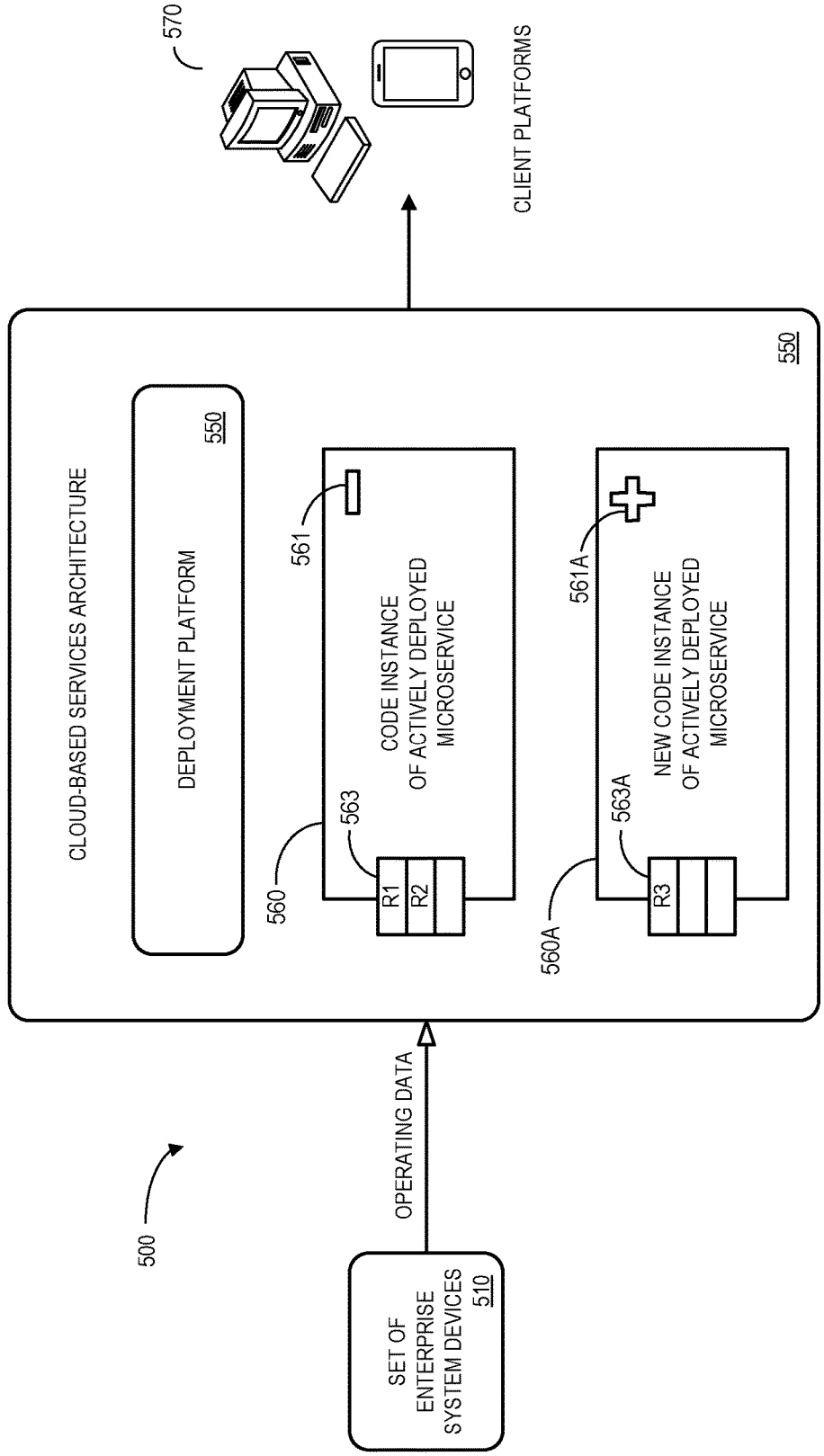
FIG. 5 illustrates a system using request caches according to some embodiments.

FIG. 5 illustrates a system 500 using request caches according to some embodiments. As before, a cloud-based services architecture 550 receives operating data from a set of enterprise system devices 510 and transmits one or more results to client platforms 570. The cloud-based services architecture 550 includes a deployment platform 520 associated with an actively deployed microservice 560, and the deployment platform 520 has determined that the microservice 560 is associated with a feature update (illustrated by a dash "−" symbol 561). As a result, a new code instance of the actively deployed microservice 560A is created that includes the new feature update (illustrated by a plus "+" symbol 561A). Note that the original code instance 560 may continue to process existing requests (e.g., "R1" and "R2" will be processed without the new feature) stored in a first cache 563 while the newly created code instance 260A will process new requests ("R3") stored in a second cache 563A.

Figure 6:
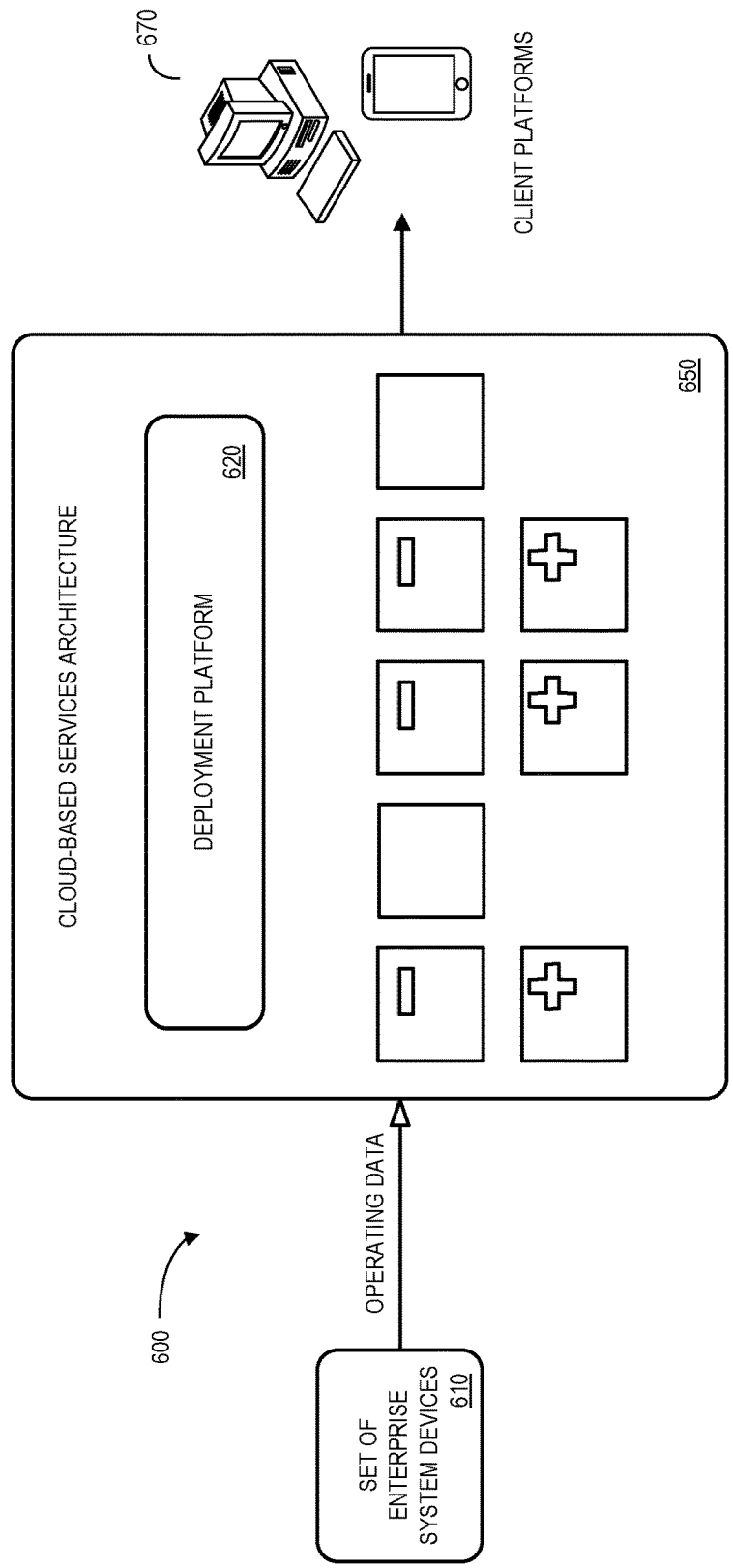
FIG. 6 is a block diagram of a system in which multiple new code instances of actively deployed microservices have been created in accordance with some embodiments.

FIG. 6 is a block diagram of a system 600 in which multiple new code instances of actively deployed microservices have been created in accordance with some embodiments. In this example, a cloud-based services architecture 650 receives operating data from a set of enterprise system devices 610 and transmits one or more results to client platforms 670. The cloud-based services architecture 650 includes a deployment platform 620 associated with a set of code instances of five actively deployed microservices, and the deployment platform 620 has determined that three of the microservices are associated with a feature update (illustrated by dash "−" symbols) while two other microservices are not. As a result, three new code instances of the three actively deployed microservices are created that includes the new feature update (illustrated by plus "+" symbols).

Figure 7:
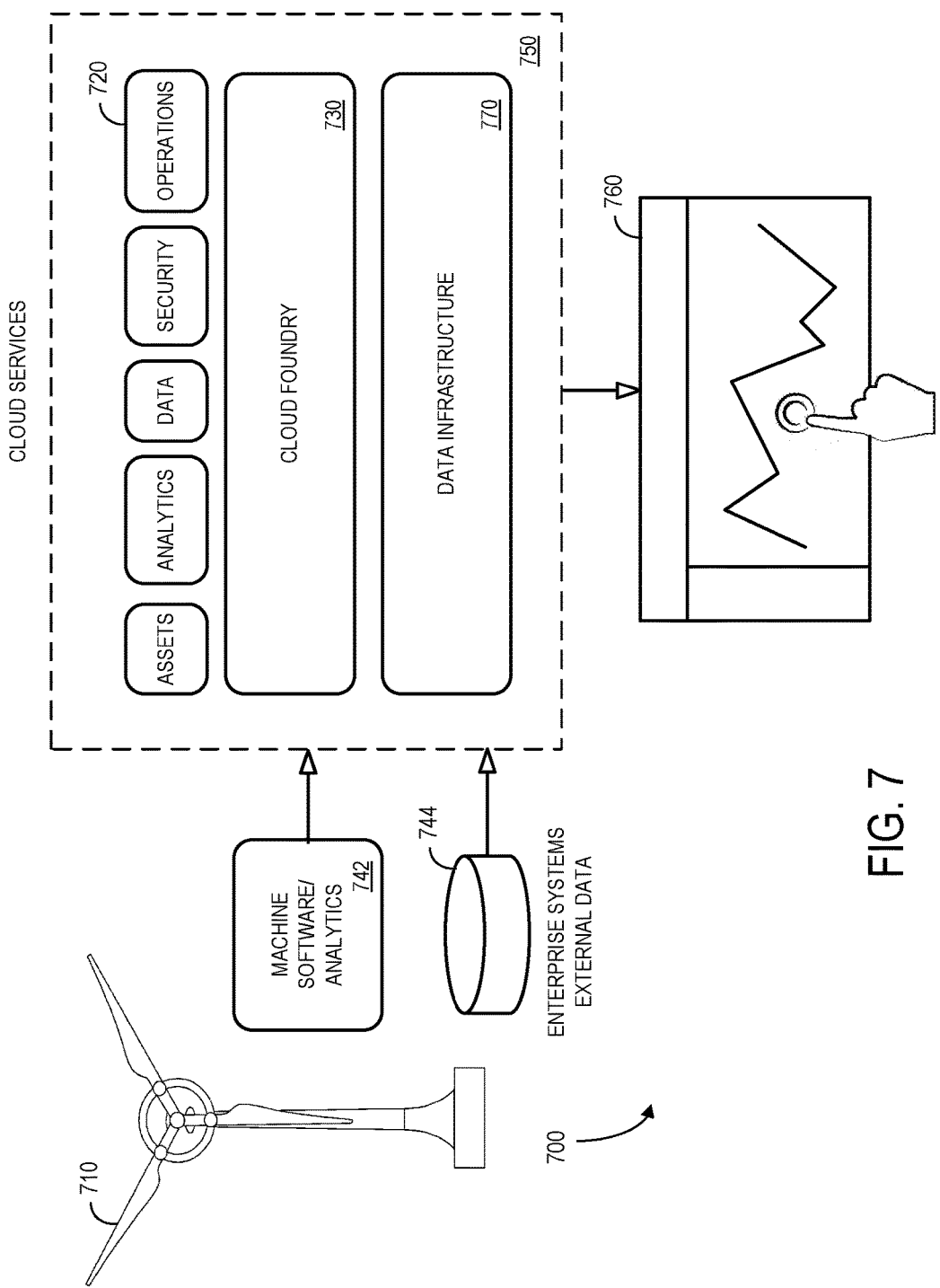
FIG. 7 is an example of a Platform as a Service being provided according to some embodiments.

FIG. 7 is an example 700 of a Platform as a Service ("PaaS") being provided according to some embodiments. The example 700 includes an industrial asset 710 associated with machine software/analytics 742 and enterprise system external data 74 that provide information to cloud services 750. The cloud services 750 include a cloud foundry 730 associated with specific functionality 720 and data infrastructure 740. The functionality 720 might include, for example, assets (e.g., associated with specific industrial equipment), analytics (e.g., to run key complex analysis algorithms on important data assets), data (e.g., to coordinate services for efficient data storage and/or modeling), security (e.g., to establish clear authorization and/or authentication for application), and/or operations (e.g., to manage building, testing, and/or deploying of applications and services).

The cloud services 750 may, for example, facilitate the presentation of interactive displays 760 (e.g., mobile display) to a user in accordance with any of the embodiments described herein. For example the cloud services 750 may automatically facilitate microservice feature deployment in an efficient and accurate manner. In this way, the system may comprise a machine-centric solution that supports heterogeneous data acquisition, storage, management, integration, and access. Moreover, the system may provide advanced predictive analytics and guide users with intuitive interfaces that are delivered securely in the cloud. In this way, users may rapidly build, securely deploy, and effectively operation industrial applications in connection with the industrial Internet of Things ("IoT").

Note that a cloud services 750 platform may offer a standardized way to enable an enterprise to quickly take advantage of operational and business innovations. By using the platform which is designed around a re-usable building block approach, developers can build applications quickly, leverage customized work, reduce errors, develop and share best practices, lower any risk of cost and/or time overruns, and/or future-proof initial investments. Moreover, independent third parties may build applications and services for the platform, allowing businesses to extend capabilities easily by tapping an industrial ecosystem. In this way, the platform may drive insights that transform and/or improve Asset Performance Management ("APM"), operations, and/or business.

Figure 8:
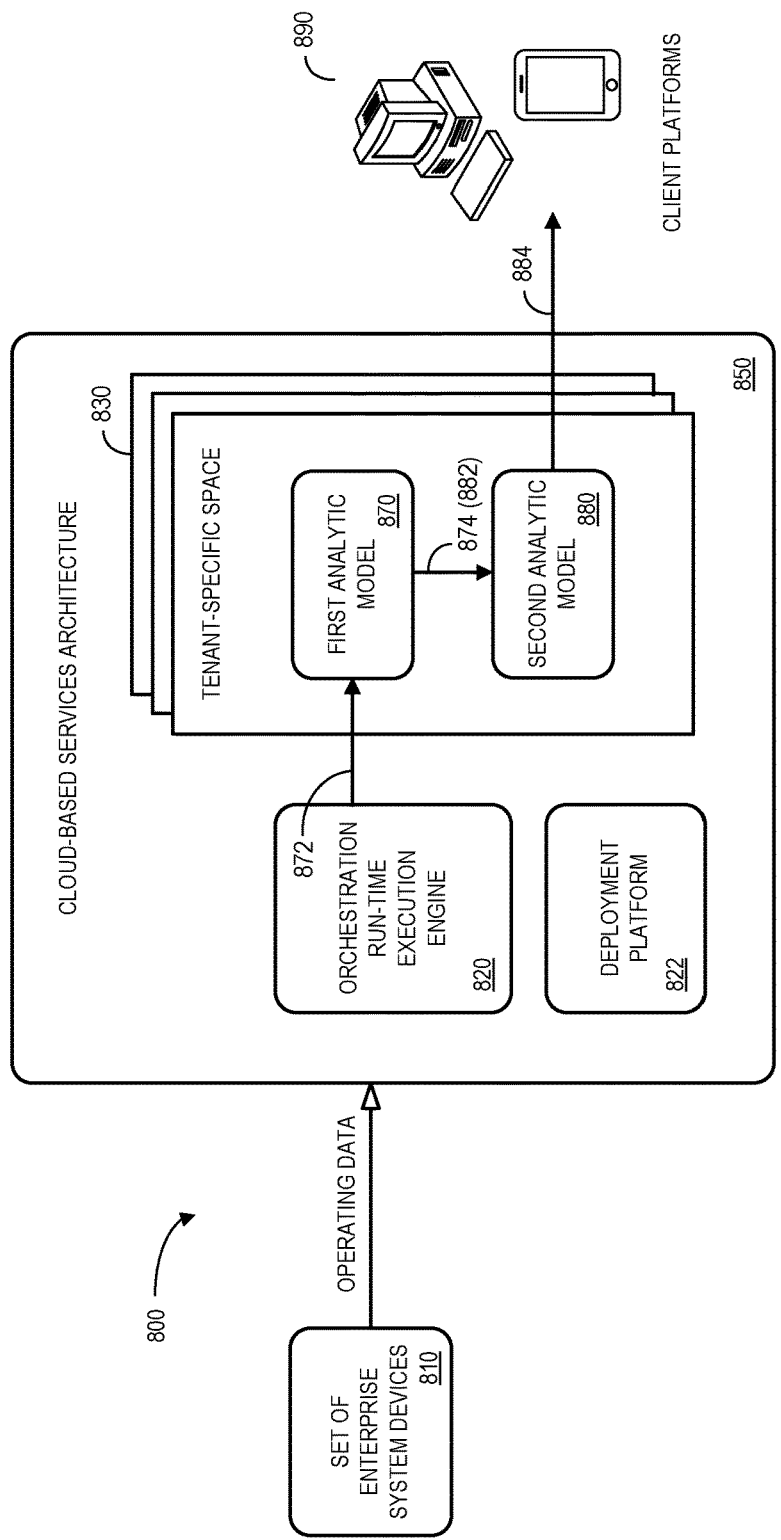
FIG. 8 is a block diagram of a system to facilitate enterprise analytics according to some embodiments.

FIG. 8 is a high level block diagram of a system 800. In particular, the system includes a set of enterprise system devices 810, such as sensors associated with one or more industrial assets. The enterprise system devices 810 may provide operating data (e.g., an exhaust temperature, a fan speed, etc.) to a cloud-based service architecture 850. The cloud-based services architecture 850 may include an orchestration run-time execution engine 820 and tenant-specific spaces 830. In some embodiments, different tenants may be associated with different enterprises that are utilizing the cloud-based services architecture 850. For example, a tenant-specific space 830 for an enterprise might execute a first analytic model application 870 and a second analytic model application 880. According to some embodiments, an enterprise may "customize" analytic models, such as by defining algorithms, inputs, outputs, etc. to be associated with each model.

As used herein, the term "tenant" may refer to, for example, a collection of users that share common access to an instance of a software application, resource, and/or the like. In some cases, a tenant may refer to a representation or instance of an organization or enterprise that has access to a multi-tenant application. A tenant may also refer to an application from among a plurality of applications competing for shared underlying resources. The multiple tenants may be logically isolated but physically integrated. For example, the degree of logical isolation may be complete isolation while the degree of physical integration may vary. When devices and services (i.e., edges) communicate with applications in the cloud, a message oriented middleware may be required to handle the complexity of routing communications to and from the cloud, while maintaining isolation between different tenants.

With a multi-tenant architecture, a software application may be designed to provide each tenant-specific space 830 a dedicated share of the instance including its data, configuration, user management, tenant individual functionality and non-functional properties. For example, a tenant-specific space 830 for an enterprise might execute a first analytic model application 870 and a second analytic model application 880. According to some embodiments, an enterprise may "customize" analytic models, such as by defining algorithms, inputs, outputs, etc. to be associated with each model.

Note that in some cases, it may be desirable to have an output of one model act as an input to another model. In the example of FIG. 8, the orchestration run-time execution engine 820 may arrange for operating data to be provided as an input 872 to the first analytic model 870. After performing logical algorithms, operations, etc. on the input 872, the first analytic model 870 may generate an output 874 that is provided directly to the second analytic model 880 as an input 882 (without exiting the tenant-specific space 830). The second analytic model 880 may then perform operations on the information to generate an output 884 that is provided to one or more remote client platforms 890 (e.g., to facilitate a presentation of an interactive enterprise display to improve the performance of the industrial assets). According to some embodiments, the output 884 may be provided to an asset service, a time-series service, and/or a Relational DataBase Management System ("RDBMS"). Moreover, a relationship between the first analytic model 870 and the second analytic model 880 might be associated with a sequence flow, a conditional flow, a custom data connector, a model library, and/or an analytic message queue. According to some embodiments, the cloud-based services architecture 850 may further include a deployment platform 822 to update microservice features in accordance with any of the embodiments described herein.

Note that operating data may be associated with a "big data" stream that is received by the cloud-based services architecture 850 on a periodic or asynchronous basis. Moreover, the client platforms 890 may, for example, be used to execute a web browser, smartphone application, etc. to provide results from and/or facilitate understating of the big data. As used herein, the phrase "big data" may refer to data sets so large and/or complex that traditional data processing applications may be inadequate (e.g., to perform appropriate analysis, capture, data curation, search, sharing, storage, transfer, visualization, and/or information privacy for the data). Analysis of big data may lead to new correlations, to spot business trends, prevent diseases, etc. Scientists, business executives, practitioners of media and advertising and governments alike regularly meet difficulties with large data sets in areas including Internet search, finance and business informatics. Scientists encounter limitations in meteorology, genomics, complex physics simulations, biological and environmental research, etc.

Any of the devices described with respect to the system 800 might be, for example, associated with a Personal Computer ("PC"), laptop computer, smartphone, an enterprise server, a server farm, and/or a database or similar storage devices. According to some embodiments, an "automated" cloud-based services architecture 850 may facilitate the collection and analysis of big data. As used herein, the term "automated" may refer to, for example, actions that can be performed with little (or no) intervention by a human.

As used herein, devices, including those associated with the cloud-based services architecture 850 and any other device described herein may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Although a single cloud-based services architecture 850 is shown in FIG. 8, any number of such devices may be included. Moreover, various devices described herein might be combined according to embodiments of the present invention. For example, in some embodiments, the cloud-based services architecture 850 and orchestration run-time execution engine 820 might be co-located and/or may comprise a single apparatus.

According to some embodiments, a workflow engine of the orchestration run-time execution service arranges for the output from the first analytic model to be provided as inputs to a plurality of other analytic models running as services in the tenant-specific space. Similarly, a workflow engine of the orchestration run-time execution service might arrange for outputs from a plurality of other analytic models running as services in the tenant-specific space are provided into the first analytic model as inputs. According to some embodiments, the output of the first analytic model is stored into a cache within the tenant-specific space before being provided as the input of the second analytic model. The cache might comprise, for example, an in-memory cache of the tenant-specific space. Because this process is performed entirely "in memory" inside the tenant-specific space, execution of the models may be efficient and relatively fast.

Figure 9:
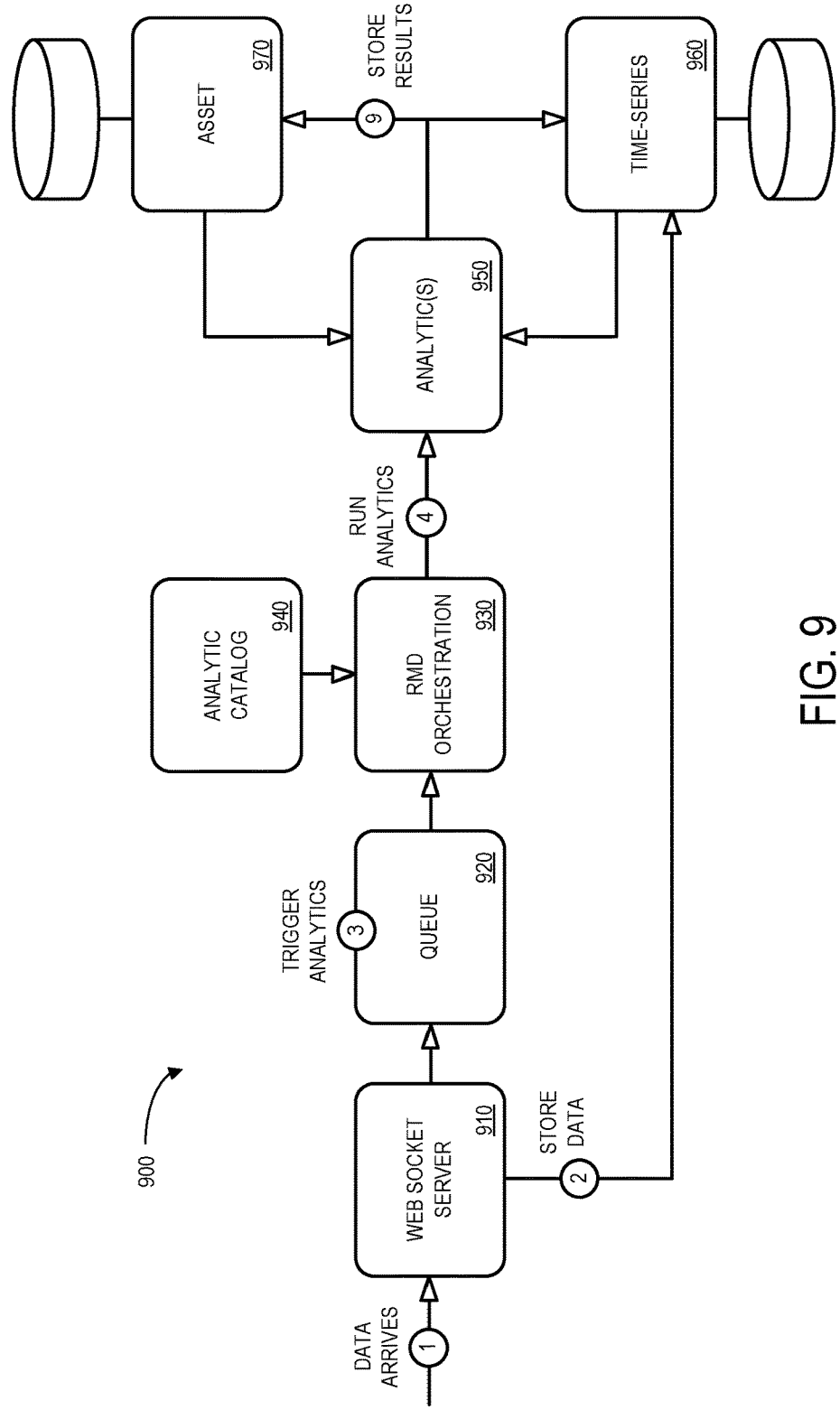
FIG. 9 is a sample analytics flow in accordance with some embodiments.

FIG. 9 is a sample analytics flow 900 in accordance with some embodiments. At (1), data may arrive at a web socket server 910. The data may be stored at (2) into a time-series 960. At (3), queue-based trigger analytics 920 may be performed and provided to Remote Monitoring and Diagnosis ("RMD") orchestration 930. The RMD orchestration 930 may utilize an analytic catalog 940 and provide run analytics to an analytics element 950 at (4). Note that the analytics element 950 may operate in accordance with any of the embodiments described herein. For example, the flow 900 may automatically facilitate microservice feature deployment in an efficient and accurate manner. The results from the analytics element 950 may be stored in an asset service 970 and/or the time-series service 960 at (5). Such an embodiment, for example, may handle data as it arrives (or changes) by placing an event on a messaging topic. A project may then read messages off of those queues, decide which analytic orchestrations to invoke, obtain the appropriate Business Process Model and Notation ("BPMN") data and analytic configuration and pass that to the orchestration engine (which may in turn invoke analytic microservices in accordance with any of the embodiments described herein).

Figure 10:
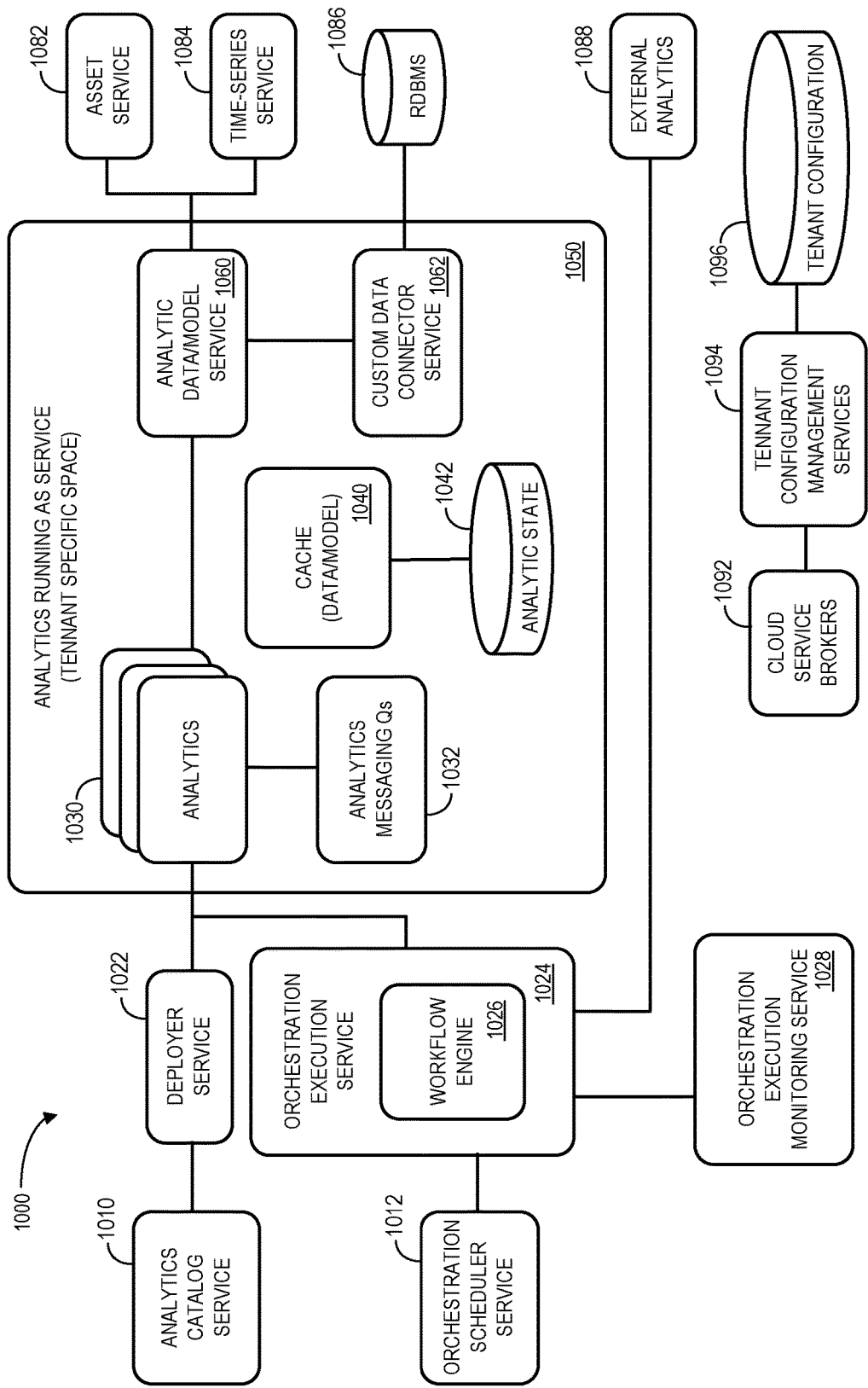
FIG. 10 is a block diagram of a cloud-based services architecture to facilitate enterprise analytics according to some embodiments.

FIG. 10 is a block diagram of a cloud-based services architecture 1000 to facilitate enterprise analytics according to some embodiments. As illustrated in FIG. 9, an orchestration execution service 1024 may interact with analytics running as a service 1050 in a tenant-specific space. Moreover, a deployer service 1022 may access an analytics catalog service 1010 (and a workflow engine 1026 of the orchestration execution service 1024 may access an orchestration schedule service 1012) to deploy analytics 1030 in the analytics running as a service 1050. The orchestration execution service 1024 may also store information into an orchestration execution monitoring service 1028 (e.g., via monitoring messaging) and external analytics 1088. Note that the analytics running as a service 960 may automatically facilitate feature updates and/or analytic model chaining within the tenant-specific space in an efficient and accurate manner in accordance with any of the embodiments described herein.

The analytics 1030 may interact with analytic message queues 1032, an analytic data/model service 1060, and/or a cache 1040 for data or a model (e.g., via get/put operations). The analytic data/model service 1060 may provide results to an asset service 1082 and/or a time-series service 1084 as well as to an RDBMS 1086 via a custom data connector service 1062. Note that the cache 1040 may store an analytic state 1042 and be used to store an output of a first analytic model within the tenant-specific space before being provided as an input of a second analytic model. The cache 1040 might comprise, for example, an in-memory cache of the tenant-specific space. Because this process is performed entirely "in memory" inside the tenant-specific space, the cache 1040 may help make execution of the models efficient and relatively fast. According to some embodiments, tenant configuration management services 1094 may receive information from cloud service brokers 1092 and store information into a tenant configuration database 1096.

Figure 11:
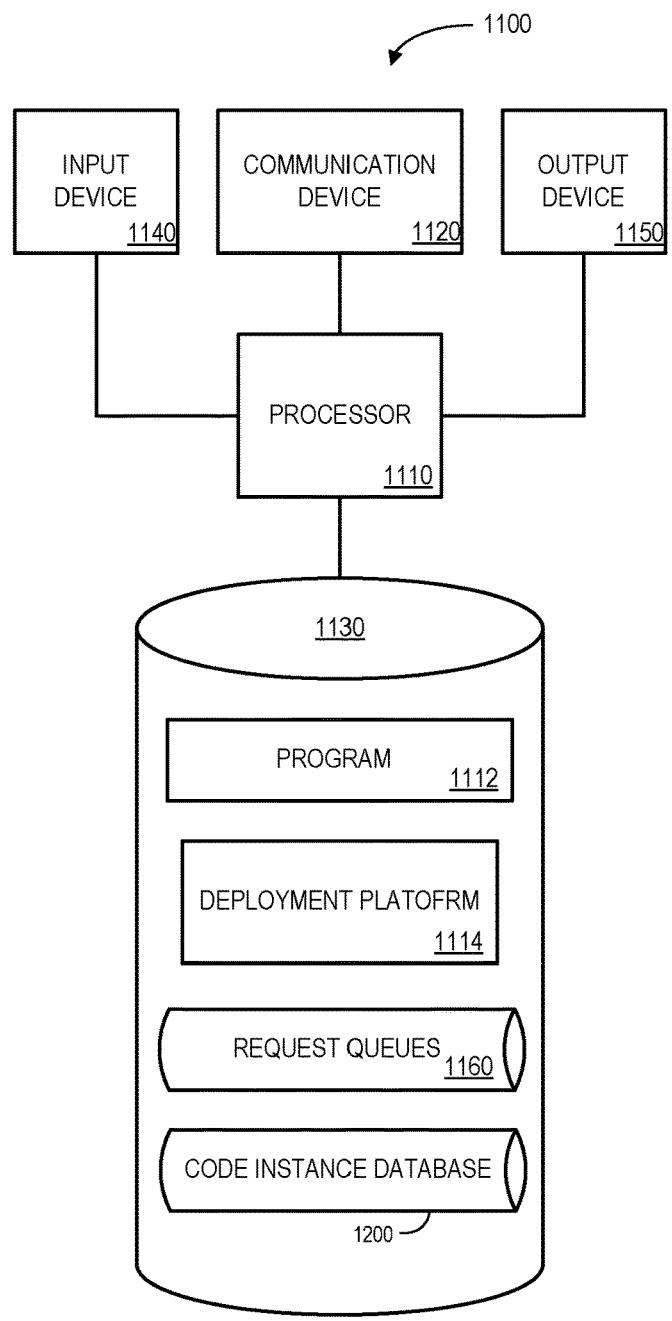
FIG. 11 is an apparatus that may be provided in accordance with some embodiments.

The embodiments described herein may be implemented using any number of different hardware configurations. For example, FIG. 11 illustrates an apparatus 1100 that may be, for example, associated with the system 800 of FIG. 8. The apparatus 1100 comprises a processor 1110, such as one or more commercially available Central Processing Units (CPUs) in the form of one-chip microprocessors, coupled to a communication device 1120 configured to communicate via a communication network (not shown in FIG. 11). The apparatus 1100 further includes an input device 1140 (e.g., a mouse and/or keyboard to enter information about industrial asset operation, user display preferences, etc.) and an output device 1150 (e.g., a computer monitor to output interactive visualizations and reports).

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or a deployment platform 1114 for controlling the processor 1110. The processor 1110 performs instructions of the programs 1112, 1114, and thereby operates in accordance with any of the embodiments described herein. For example, the processor 1110 might receive operating data from a set of enterprise system devices. The operating data may be processed, for example, via requests handled by analytic microservices. The deployment platform 1114 may create code instances of actively deployed analytic microservices and identify an existing deployed analytic microservice as being associated with a feature update, the existing deployed analytic microservice being associated with a set of pending requests. The deployment platform 1114 may create a new code instance of the identified analytic microservice and arrange for the existing deployed analytic microservice to process the set of pending requests while the new code instance handles newly received requests. The deployment platform 1114 may then determine that the existing deployed analytic microservice has completely processed the set of pending requests and retire the existing deployed analytic microservice such that it is replaced by the new code instance.

The programs 1112, 1114 may be stored in a compressed, uncompiled and/or encrypted format. The programs 1112, 1114 may furthermore include other program elements, such as an operating system, a database management system, and/or device drivers used by the processor 1110 to interface with peripheral devices.

As used herein, information may be "received" by or "transmitted" to, for example: (i) the apparatus 1100 from another device; or (ii) a software application or module within the apparatus 1100 from another software application, module, or any other source.

As shown in FIG. 11, the storage device 1130 also stores a cache 1160 and a code instance database 1200. One example of the code instance database 1200 that may be used in connection with the apparatus 1100 will now be described in detail with respect to FIG. 12. The illustration and accompanying descriptions of the database presented herein is exemplary, and any number of other database arrangements could be employed besides those suggested by the figures.

Figure 12:
FIG. 12 is a tabular view of a portion of a code instance database in accordance with some embodiments of the present invention.

FIG. 12 is a tabular view of a portion of the code instance database 1200 in accordance with some embodiments of the present invention. The table includes entries associated with microservices that are actively deployed to facilitate management of industrial assets for an enterprise. The table also defines fields 1202, 1204, 1206, 1208, 1210, 1212 for each of the entries. The fields specify: a microservice identifier 1202, feature update 1204, new code instance 1206, old requests 1208, new requests 1210, and a status 1212. The information in the code instance database 1200 may be periodically created as new features need to be deployed in connection with the monitoring of an industrial asset's operation.

The analytic model identifier 1002 might be a unique alphanumeric code identifying 1002 a microservice that may be deployed in a cloud-based services architecture to facilitate enterprise analytics. The feature update 1204 may indicate whether or not a new software feature is ready to be deployed for that microservice. The new code instance 1206 might indicate if a newly created code instance (with the newly deployed feature) has been created. The old requests 1208 might list those requests that are still being processed by the original code instance (e.g., that were received prior to creation of the new code instance 1206). The new requests 1210 might list those requests that are now being processed by the new code instance 1206 (e.g., that were received after creation of the new code instance 1206). The status 1212 might indicate whether the microservice is active, retired, etc.

Figure 13:
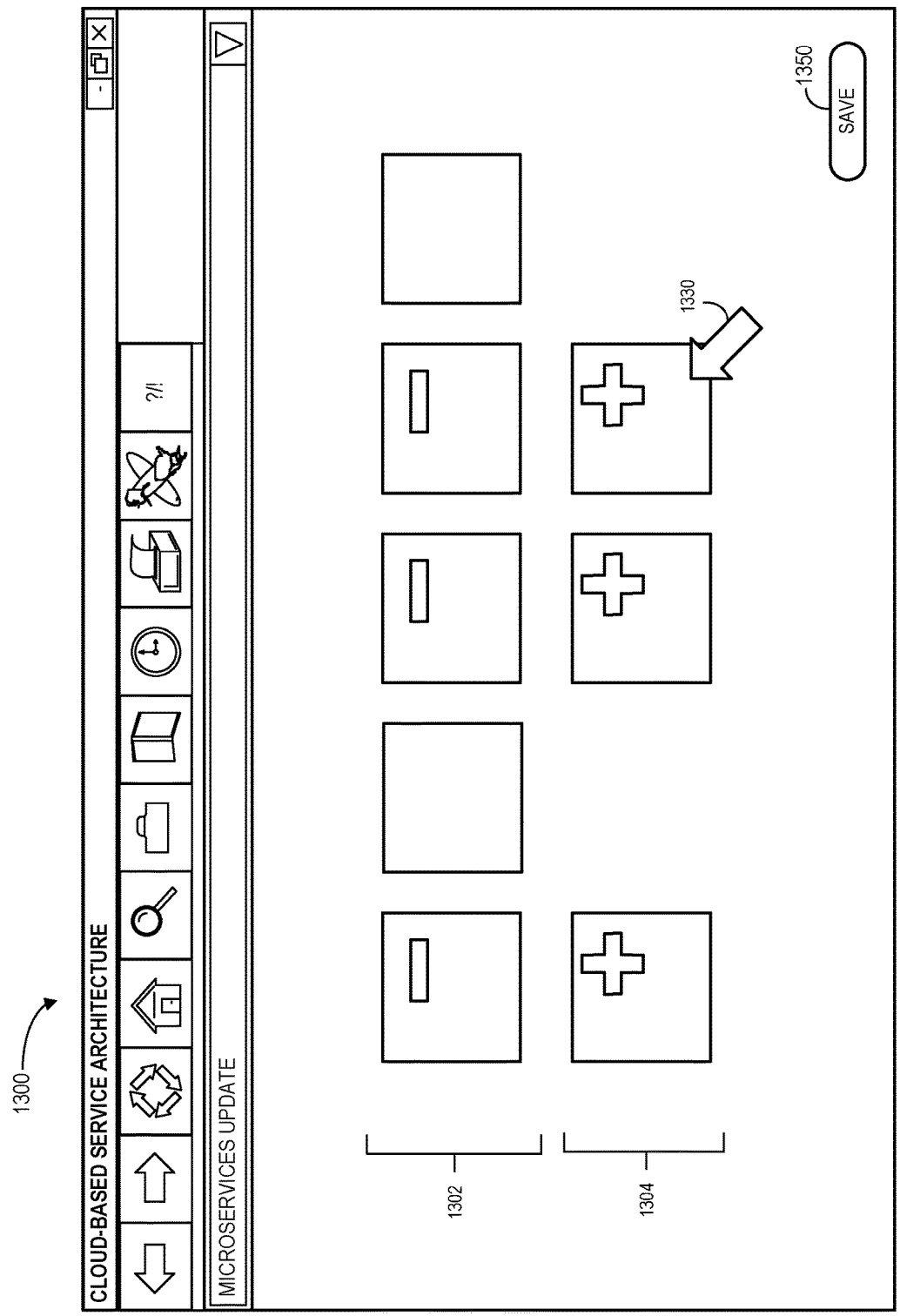
FIG. 13 illustrates an interactive graphical user display including analytic model customization examples according to some embodiments.

FIG. 13 illustrates an interactive graphical user display 1300 including representations of microservices 1302 in accordance with some embodiments. In particular the representations of microservices 1302 might include a graphical indication of whether or not a newly deployed feature update is available for each microservice (illustrated with a dash "−" sign in FIG. 13). For each of those three microservices with an available feature update, a new code instance 1304 is created including the new feature (illustrated with a plus "+" sign in FIG. 13). According to some embodiments, selection of a graphical representation of a microservice with a pointer icon 1330 (or touch screen) will result in further information about that microservice being presented (e.g., a date and time of creation, an update status, pending requests, sanity test results, etc.). Moreover, selection of another icon 1350 might save data, generate reports, initiate microservice deployment, etc.

Thus, some embodiments described herein may automatically facilitate microservice feature deployment in an efficient and accurate manner. Moreover, such an approach may increase asset utilization with predictive analytics, improving performance and efficiency that can result in lower repair costs. Moreover, embodiments may achieve new levels of performance, reliability, and availability throughout the life cycle of an industrial asset.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases and apparatus described herein may be split, combined, and/or handled by external systems). Applicants have discovered that embodiments described herein may be particularly useful in connection with industrial asset management systems, although embodiments may be used in connection other any other type of asset.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system to facilitate enterprise analytics, comprising:
 a set of enterprise system devices to collect and transmit operating data; and
 a cloud-based services architecture, to receive the operating data from the set of enterprise system devices, including:
  a plurality of analytic microservices to process the operating data via requests,
  a deployment platform to:
   create code instances of actively deployed analytic microservices,
   identify an existing deployed analytic microservice as being associated with a feature update, the existing deployed analytic microservice being associated with a set of pending requests,
   create a new code instance of the identified analytic microservice,
   arrange for the existing deployed analytic microservice to process the set of pending requests while the new code instance handles newly received requests,
   determine that the existing deployed analytic microservice has completely processed the set of pending requests, and
   retire the existing deployed analytic microservice such that it is replaced by the new code instance, and
  an orchestration run-time execution service to manage creation and execution of a first analytic model and a second custom analytic model in a tenant-specific space such that:
   the first analytic model is customized to run as a service having: (i) at least some of the received operational data as an input, and (ii) a result of a first analytics process as an output, and
   the second analytic model is customized to run as a service having: (i) the output of the first analytic model as an input, and (ii) a result of a second analytics process as an output,
   wherein the input of the second analytic model is received from the output of the first analytic model without leaving the tenant-specific space.

2. The system of claim 1, wherein the deployment platform identifies a plurality of existing deployed analytic microservices as being associated with feature updates and simultaneously creates new code instances for the microservices.

3. The system of claim 1, wherein the deployment platform identifies a plurality of existing deployed analytic microservices as being associated with feature updates and simultaneously creates new code instances for a subset of the microservices.

4. The system of claim 1, wherein the deployment platform is further to, prior to arranging for the new code instance to handle newly received requests, execute a performance test for the new code instance.

5. The system of claim 4, wherein the performance test is associated with at least one of: (i) a simulated response to a request, (ii) a database use, or (iii) sensor data use.

6. The system of claim 1, wherein the feature update is associated with at least one of: (i) a security element, (ii) synchronous request processing, and (iii) asynchronous request processing.

7. The system of claim 1, wherein a workflow engine of the orchestration run-time execution service arranges for the output from the first analytic model is provided as inputs to a plurality of other analytic models running as services in the tenant-specific space.

8. The system of claim 1, wherein a workflow engine of the orchestration run-time execution service arranges for outputs from a plurality of other analytic models running as services in the tenant-specific space are provided into the first analytic model as inputs.

9. The system of claim 1, wherein the output of the second analytic model is to be provided to at least one of: (i) an asset service, (ii) a time-series service, and (iii) a relational database management system.

10. The system of claim 1, wherein the set of enterprise system devices are associated with at least one of: (i) sensors, (ii) a big data stream, (iii) an industrial asset, (iv) a power plant, (v) a wind farm, (vi) a turbine, (vii) power distribution, (viii) fuel extraction, (ix) healthcare, (x) transportation, (xi) aviation, (xii) manufacturing, and (xiii) water processing.

11. The system of claim 1, wherein the cloud-based services architecture is further associated with at least one of: (i) edge software, (ii) data management, (iii) security, (iv) development operations, and (v) mobile applications.

12. A computer-implemented method to facilitate enterprise analytics, comprising:
   collecting operating data from a set of enterprise system devices;
   receiving, via a cloud-based services architecture, the operating data from the set of enterprise system devices;
   processing the operating data via requests handled by a plurality of analytic microservices;
   creating, by a deployment platform, code instances of actively deployed analytic microservices;
   identifying, by the deployment platform, an existing deployed analytic microservice as being associated with a feature update, the existing deployed analytic microservice being associated with a set of pending requests;
   creating, by the deployment platform, a new code instance of the identified analytic microservice;
   arranging, by the deployment platform, for the existing deployed analytic microservice to process the set of pending requests while the new code instance handles newly received requests;
   determining, by the deployment platform, that the existing deployed analytic microservice has completely processed the set of pending requests;
   retiring, by the deployment platform, the existing deployed analytic microservice such that it is replaced by the new code instance; and
   managing, by an orchestration run-time execution service, creation and execution of a first analytic model and a second custom analytic model in a tenant-specific space such that:
   the first analytic model is customized to run as a service having: (i) at least some of the received operational data as an input, and (ii) a result of a first analytics process as an output, and
   the second analytic model is customized to run as a service having: (i) the output of the first analytic model as an input, and (ii) a result of a second analytics process as an output,
   wherein the input of the second analytic model is received from the output of the first analytic model without leaving the tenant-specific space.

13. The method of claim 12, wherein the deployment platform identifies a plurality of existing deployed analytic microservices as being associated with feature updates and simultaneously creates new code instances for the microservices.

14. The method of claim 12, wherein the deployment platform identifies a plurality of existing deployed analytic microservices as being associated with feature updates and simultaneously creates new code instances for a subset of the microservices.

15. The method of claim 12, wherein the deployment platform is further to, prior to arranging for the new code instance to handle newly received requests, execute a performance test for the new code instance.

16. A non-transitory, computer-readable medium storing instructions that, when executed by a computer processor, cause the computer processor to perform a method, the method comprising:
   collecting operating data from a set of enterprise system devices;
   receiving, via a cloud-based services architecture, the operating data from the set of enterprise system devices;
   processing the operating data via requests handled by a plurality of analytic microservices;
   creating, by a deployment platform, code instances of actively deployed analytic microservices;
   identifying, by the deployment platform, an existing deployed analytic microservice as being associated with a feature update, the existing deployed analytic microservice being associated with a set of pending requests;
   creating, by the deployment platform, a new code instance of the identified analytic microservice;
   arranging, by the deployment platform, for the existing deployed analytic microservice to process the set of pending requests while the new code instance handles newly received requests;
   determining, by the deployment platform, that the existing deployed analytic microservice has completely processed the set of pending requests;
   retiring, by the deployment platform, the existing deployed analytic microservice such that it is replaced by the new code instance; and
   managing, by an orchestration run-time execution service, creation and execution of a first analytic model and a second custom analytic model in a tenant-specific space such that:
   the first analytic model is customized to run as a service having: (i) at least some of the received operational data as an input, and (ii) a result of a first analytics process as an output, and
   the second analytic model is customized to run as a service having: (i) the output of the first analytic model as an input, and (ii) a result of a second analytics process as an output, wherein the input of the second analytic model is received from the output of the first analytic model without leaving the tenant-specific space.

17. The medium of claim 16, wherein the deployment platform identifies a plurality of existing deployed analytic microservices as being associated with feature updates and simultaneously creates new code instances for the microservices.

18. The medium of claim 16, wherein the deployment platform identifies a plurality of existing deployed analytic microservices as being associated with feature updates and simultaneously creates new code instances for a subset of the microservices.

19. The medium of claim 16, wherein the deployment platform is further to, prior to arranging for the new code instance to handle newly received requests, execute a performance test for the new code instance.

* * * * *